(12) United States Patent
Siess et al.

(10) Patent No.: US 6,721,385 B2
(45) Date of Patent: Apr. 13, 2004

(54) REVOLUTION COUNTER FOR DETERMINING A NUMBER OF REVOLUTIONS OF A ROTARY ELEMENT

(75) Inventors: Rainer Siess, Erlangen (DE); Ulrich Wetzel, Berga (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/272,476

(22) Filed: Oct. 16, 2002

(65) Prior Publication Data
US 2003/0072405 A1 Apr. 17, 2003

(30) Foreign Application Priority Data
Oct. 17, 2001 (DE) .......................... 101 51 234

(51) Int. Cl.[7] .............................. G06M 11/00
(52) U.S. Cl. .................. 377/3; 377/15; 377/16
(58) Field of Search ................. 377/3, 15, 16

(56) References Cited

U.S. PATENT DOCUMENTS 6,084,400 A * 7/2000 Steinich et al. ........ 324/207.13

6,512,366 B2 * 1/2003 Siess .................. 324/207.25

FOREIGN PATENT DOCUMENTS

| DE | 26 39 047 | | 9/1977 |
| DE | 32 47 174 | A1 | 6/1984 |
| DE | 44 07 474 | C2 | 7/2000 |
| EP | 0 658 745 | B1 | 6/1998 |

* cited by examiner

*Primary Examiner*—Margaret R. Wambach
(74) *Attorney, Agent, or Firm*—Henry M. Feiereisen

(57) ABSTRACT

A revolution counter includes a single sensor which scans movement of a rotary element and generates a raw signal commensurate with a rotary position of the rotary element for ascertaining one of at least three areas of angular ranges. Two of these areas include each a single continuous angular range, whereas a third area includes at least two angular ranges, which interrelate but are separated from one another. A power generation system delivers energy pulses to the sensor, when the rotary element rotates below a minimum value, so that a raw signal can be detected and the corresponding angular range area can be determined. The power generation system and the rotary element are so interconnected as to ascertain for at least part of the thus determined areas of angular ranges, by which of the angular ranges the rotary element is rotated, and to establish the number of revolutions based on the ascertained angular ranges.

11 Claims, 2 Drawing Sheets

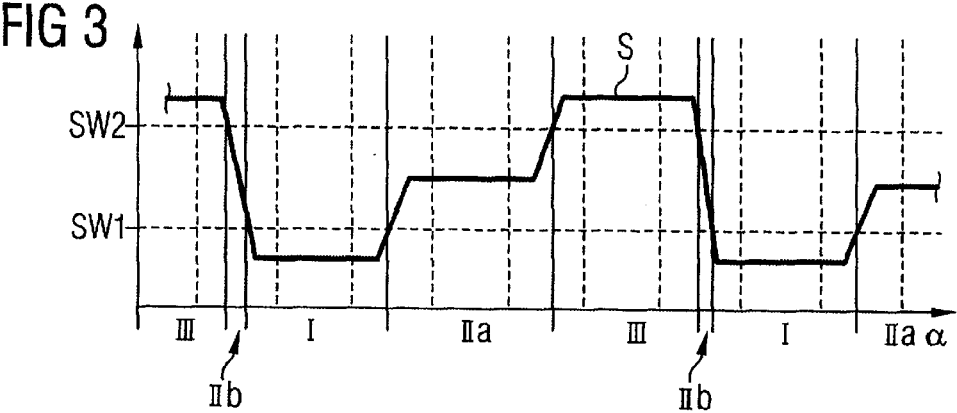
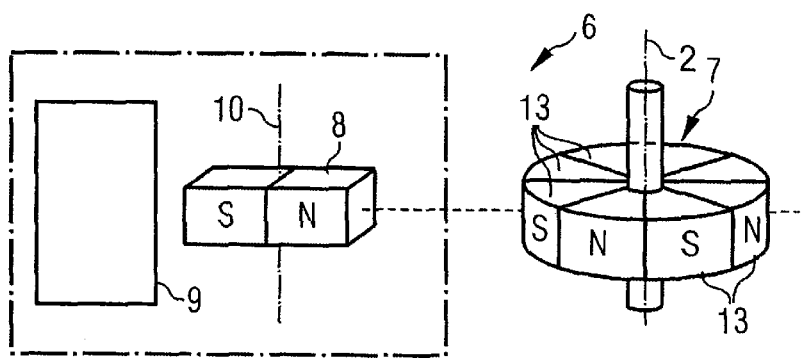
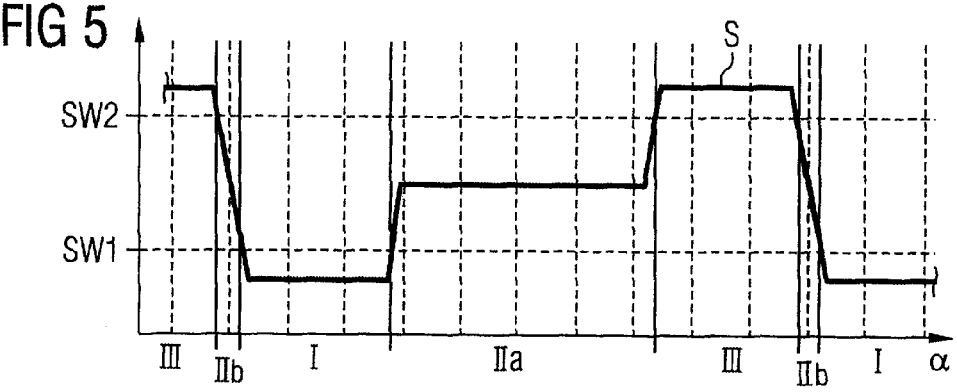

REVOLUTION COUNTER FOR DETERMINING A NUMBER OF REVOLUTIONS OF A ROTARY ELEMENT

CROSS-REFERENCES TO RELATED APPLICATIONS

This application claims the priority of German Patent Application, Serial No. 101 51 234.1, filed Oct. 17, 2001, pursuant to 35 U.S.C. 119(a)–(d), the disclosure of which is incorporated herein by reference.

BACKGROUND OF THE INVENTION

The present invention relates, in general, to a revolution counter for determining the number of revolutions of rotary element rotation about a rotation axis.

European Pat. No. EP 0 658 745 B1 describes a revolution counter for counting the revolutions of a rotary element, including a sensor arrangement and a power generation system which cooperate in a way that energy pulses are delivered to the sensor arrangement also in situations when the rotary element rotates at a low speed and the regular power supply is switched off. As an energy pulse is delivered, the sensor arrangement detects at least one respective raw signal, whereby the power generation system and the rotary element are coupled in a way as to allow a determination of the angular range by which the rotary element is rotated and to infer from the detection of angular ranges the number of revolutions. A similar revolution counter is disclosed in German Pat. No. DE 44 07 474 C2.

German Pat. Publication No. DE 32 47 174 A1 describes a revolution counter with a sensor for scanning the position of a rotary element and an evaluation circuit arranged in succession to the sensor. This reference purports to ascertain one of three angular range areas on the basis of a raw signal from the sensor for each rotary position of the rotary element. Each angular range area includes hereby a plurality of angular ranges which interrelate but are separate from one another. The sensor is supplied continuously with electric energy. The evaluation circuit determines on the basis of the continuously detected raw signals the number of revolutions.

German Pat. Publication No. DE 26 39 047 A1 discloses a tachometer for measuring rotation speeds, including a sensor for scanning a rotary element and an evaluation circuit placed in succession of the sensor. The tachometer includes a power generation system which supplies the sensor with power so long as the rotary movement of the rotary element is above a minimum rotation speed.

Common to all these conventional revolution counters is the fact that the power generation system is identical with the sensor arrangement and is activated when the rotary element assumes a predetermined position relative to the sensor arrangement. A determination of the rotary position between these positions is not possible. This applies even when the sensor arrangement is supplied permanently with electric energy. Moreover, the raw signals are generated only momentarily in all these conventional revolution counters. Thus, the conventional revolution counters are constructed for determination of predetermined positions only. Whether the rotary element remains then in this rotary position or continues to move cannot be ascertained.

The prior art revolution counters suffer more shortcomings. A main drawback is the fact that only changes of the rotary position can be determined but not the rotary position per se. In addition, faster rotary movements require the provision of a different evaluation process because the power generation system, which is identical with the sensor arrangement, will no longer operate reliably when faster rotary movement are involved. Also, either the rotation direction can be determined only by a complicated evaluation of the chronological sequence of the raw signals generated when the rotary element reaches one of the predetermined positions, or a complex system is required with questionable reliability during continuous operation.

It would therefore be desirable and advantageous to provide an improved revolution counter, which obviates prior art shortcomings and is simple in structure to enable determination of the rotary position and rotation direction of a rotary element, while yet being reliable in operation.

SUMMARY OF THE INVENTION

According to one aspect of the present invention, a revolution counter for determining a number of revolutions of a rotary element, includes a sensor arrangement having a single sensor, and an evaluation circuit placed downstream of the sensor, with the sensor scanning the rotary element and generating a raw signal commensurate with a rotary position of the rotary element for ascertaining one of at least three areas of angular ranges, wherein a first area and a second area of the at least three areas of angular ranges each include a single continuous angular range and a third area of the at least three areas of angular ranges includes at least two angular ranges which interrelate but are separated from one another, and a power generation system constructed to deliver energy pulses to the sensor arrangement, when the rotary element rotates below a minimum rotation speed, wherein the sensor arrangement generates the raw signal commensurate with a determination of the corresponding one of the areas of angular ranges, wherein the power generation system and the rotary element are so coupled to one another as to ascertain for at least part of the first, second and third areas of angular ranges as determined during output of the energy pulses, by which one of the angular ranges the rotary element is rotated, and to establish the number of revolutions based on the ascertained angular ranges.

According to another feature of the present invention, the power generation system and the rotary element can be so coupled to one another as to output the energy pulses, when the rotary element rotates below the minimum rotation speed, while the rotary element is positioned in one of a plurality of known pulse angular ranges, and to ascertain on the basis of the known pulse angular ranges by which of the two angular ranges of the third area the rotary element is rotated.

As an alternative, it is also possible to determine each of the angular ranges of the third area on the basis of previously or subsequently ascertained first and second areas of angular ranges.

According to another feature of the present invention, the power generation system is able to supply energy continuously to the sensor arrangement, when the rotary element rotates above a minimum rotation speed, whereby the sensor arrangement continuously registers the raw signals and the corresponding first, second and third areas of angular ranges as well as ascertains for the third area by which of the two angular ranges of the third area the rotary element is rotated, to thereby determine the number of revolutions. In this way, a revolution counter according to the present invention, is able to correctly acquire the number of revolution for each and every rotation speed, i.e. especially for a rotation speed above the minimum level, without a need for an external power supply.

The determination of the angular ranges can be realized in a particularly simple manner, when a part of the first, second or third areas of angular ranges, corresponding to a raw signal, includes a single angular range.

According to another feature of the present invention, the sensor arrangement may be constructed for clocked operation to realize an energy-saving operation.

According to another aspect of the present invention, a method for determining a number of revolutions of a rotary element, includes the steps of subdividing a rotary element into at least a first area of singular angular range area, a second area of singular angular range, and a third area of at least two relating but separate angular ranges, scanning the rotary element, as it rotates, to generate an output signal for each rotary position, associating the output signal to a one of the angular range areas whereby the association of the output signal to the third area is realized by generating an energy pulse only when the rotary element is positioned in one of the angular ranges of the third area.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a graph showing the relation between raw signals by the sensor in dependence of a rotation angle of the rotary element;

FIG. 4 is a schematic illustration of components of a power generation system for supply of electric energy to the sensor; and FIG. 5 is a graph showing the relation between raw signals determined by the sensor in dependence of a rotation angle of the rotary element for another embodiment of a revolution counter according to the invention.

DETAILED DESCRIPTION OF PREFERRED EMBODIMENTS

Figure 1:
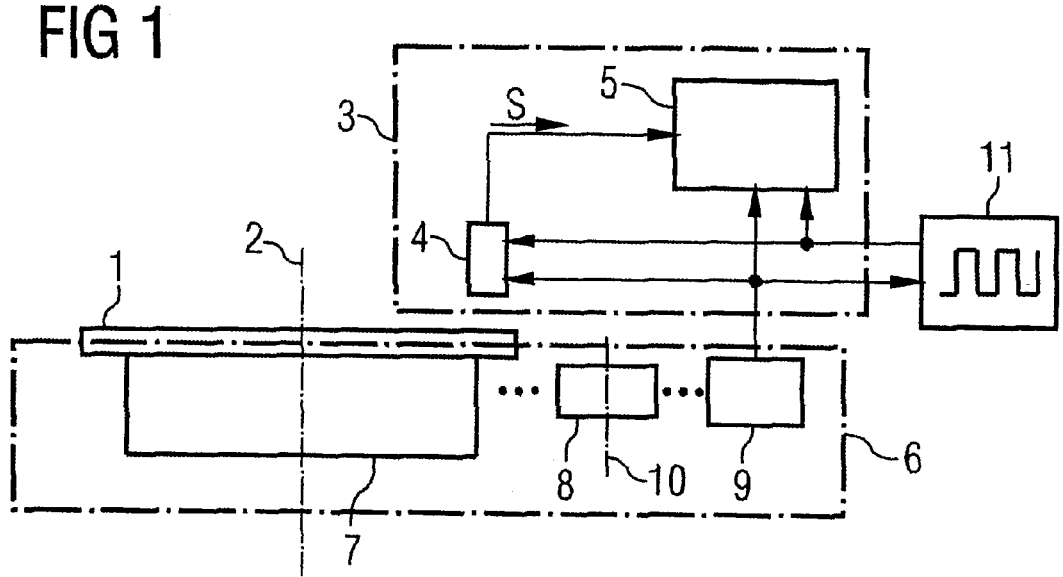
FIG. 1 is a block diagram showing the relationship of components of a revolution counter according to the present invention.

Throughout all the Figures, same or corresponding elements are generally indicated by same reference numerals.

Turning now to the drawing, and in particular to FIG. 1, there is shown a block diagram showing the relationship of components of a revolution counter according to the present invention, including a rotary element 1, which rotates about a rotation axis 2, and as sensor arrangement 3 for determining a rotary position of the rotary element 1. The number of revolutions, executed by the rotary element 1, can then be ascertained on the basis of the sequence of determined rotary positions. The sensor arrangement 3 includes a single sensor 4 for scanning the rotary element 4, and an evaluation circuit 5 placed downstream of the sensor 4.

Supply of power to the sensor arrangement 3 is realized by a power generation system 6 which essentially includes an exciter magnet 7, arranged in fixed rotative engagement with the rotary element 1, an energy storage magnet 8, which is reversible about a pivot axis 10, and a coil 9 with subsequent electronic rectifier and energy storage assembly. Power consumption by the sensor arrangement 3 can be minimized through provision of a clock generator 11 by which the sensor arrangement 3 can be operated in clocked manner.

Figure 2:
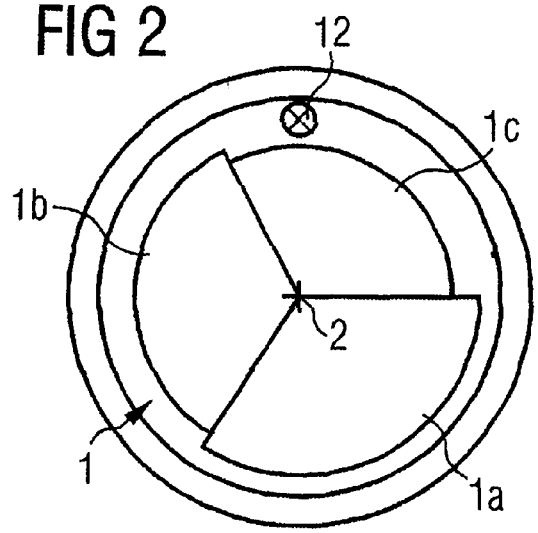
FIG. 2 is a block diagram of a sensor with a rotary element of the revolution counter.

The following description explains the principal process of signal evaluation by the sensor 4 with reference to FIGS. 2 and 3.

FIG. 2 is a block diagram of the sensor 4 with the rotary element 1 of the revolution counter, whereby in the non-limiting example involved here the sensor 4 is configured as optical sensor and the rotary element 1 is an optical screen having at least three screen zones 1a, 1b, 1c. The screen zone 1a blocks the sensor 4 completely from incoming light from a light source 12, operated in pulsed fashion, whereas the screen zone 1c is transparent to allow full penetration of light. The screen zone 1b partly shields light from the sensor 4. The light source 12 may be, e.g., a laser diode or a light-emitting diode.

The sensor 4 generates a raw signal S which has basically the profile shown in FIG. 3 and is plotted as a function of a rotation angle a of the rotary element 1. In view of the finite size of the light source 12 and the sensor 4, transitions between the signal levels are imprecise. Yet, the raw signal S can be evaluated in a relatively simple manner through comparison of threshold values SW1, SW2.

When the raw signal S has a level above the threshold value SW2, the screen zone 1c of the rotary element 1 is primarily scanned. This screen zone 1c corresponds to an angular range area III. When the raw signal S is below the threshold value SW1, the screen zone 1a is predominantly scanned, which corresponds to angular range area I. A raw signal S between the threshold values SW1, SW2 results in a scanning of either the screen zone 1b, commensurate with angular range area IIa, or a transition zone from the screen zone 1a to the screen zone 1c, commensurate with angular range IIb. Thus, in each possible rotary position of the rotary element 1 a raw signal S is generated by the sensor 4 and associated to a one of the angular range areas I, II, III. Each of the areas I and II includes hereby only a single angular range, while area II has two angular ranges IIa, IIb commensurate with the screen zone being scanned, i.e. whether screen zone 1b or the transition zone from screen zone 1a to screen zone 1b is scanned.

As areas I and II have only a single angular range, the rotary position of the rotary element 1 can be directly ascertained, when the respective level of the raw signal S is registered, i.e. it can be directly determined about which of the angular ranges I, III the rotary element 1 has rotated. Such direct determination cannot be realized, when the raw signal S falls in the area II of angular ranges IIa, IIb. The following description relates to the determination of the rotary position of the rotary element 1 also in the area II, i.e. the determination about which of the angular ranges IIa, IIb the rotary element 1 is rotated.

As shown in FIG. 4, which is a schematic illustration of the components of the power generation system 6, the exciter magnet 7 has a number of sectors 13. The minimum number of sectors 13 is six. Suitably, the exciter magnet 7 has six, eight, ten or twelve sectors 13. The exciter magnet 7 acts on the energy storage magnet 8 which is constructed as a magnetic dipole and is operatively connected to the coil 9. In situations, when the rotary element 1 rotates at a very slow speed, i.e. a rotary movement below the minimum rotation speed, the energy storage magnet 8 reverses impulsively, when predetermined pulse angular ranges have been reached, i.e. when, as shown in the disposition in FIG. 4, the repelling forces between the north pole of the energy storage magnet 8 and the confronting north pole of the exciter magnet 7 are sufficient enough to effect the reversal. These instances, when a reversal of the energy storage magnet 8 occurs, and thus these pulse angular ranges are known and have been indicated in FIG. 3 by vertical broken lines. As a consequence, an energy pulse is forcibly induced in the coil 9 and transmitted to the sensor arrangement 3. Thus, the sensor arrangement 3, including the light source 12, can be operated for a brief period. In view of the generated energy pulse, at least one raw signal S can be detected and associated to the corresponding one of the angular range areas I, II, III.

As described above, the exciter magnet 7 is connected in fixed rotative engagement with the rotary element 1. It is, however, possible, to turn the exciter magnet 7 by an angle with respect to the rotary element 1. Thus, the pulse angular ranges can be oriented relative to the rotary element 1 in such a manner that the reversal of the energy storage magnet 8 can be executed only when the rotary element 1 is at a location away from the angular range IIb. Thus, even when the raw signal S falls between the threshold values SW1, SW2, reference to the known pulse angular range (indicated by vertical broken lines in FIG. 3) enables a precise determination that the rotary element 1 is rotated by the angular range IIa. This is because the configuration of the revolution counter will not allow generation of energy pulses while the rotary element 1 is located in the angular range IIb. In this case, the power generation system 6 and the rotary element 1 are coupled in such a way that the exciter magnet 7 is turned at a suitable offset angle relative to the rotary element 1, and the pulse angular ranges, where energy pulses can be generated, are known.

The afore-described embodiment permits determination of the angular range I, IIa, III by which the rotary element 1 is rotated not only for part of the areas I, II, III of angular ranges, ascertained when an energy pulse is transmitted, but for all angular range areas I, II, III. Based on the sequence of determined angular ranges I, IIa, III, the number of revolutions, executed by the rotary element 1, can be easily determined.

Even when it cannot be excluded with all certainty that the raw signal S is detected at a moment when the transition between the screen zones 1a and 1c is scanned, i.e. the rotary element 1 is rotated about the angular range IIb, an appropriate configuration of the revolution counter still allows an accurate determination whether a raw signal S corresponding to the angular range area II should be associated to the angular range IIa or angular range IIb, as will now be described with reference to FIG. 5.

When the rotary element 1 executes a complete revolution, at least ten energy pulses are generated. This is indicated in FIG. 5 by the representation of vertical broken lines. At least two pulse angular ranges are provided in the angular range I, and at least two pulse angular ranges are provided in the angular range II. The angular range IIa has at least four, or even five pulse angular ranges as shown in FIG. 5, whereas the angular range IIb has only a single pulse angular range.

The provision of at least two pulse angular ranges in the angular ranges I and III ensures that the angular ranges I and III are detected at least once during a revolution, when—for whatever reason—a single scanning operation fails. For the same reason, the angular range IIa has five pulse angular ranges so that the angular range IIa is scanned per revolution of the rotary element 1 up to five times. Even when a most unfavorable scenario is anticipated, the sensor 4 will at least register twice. In the angular range IIb only a single scanning procedure is carried out per revolution.

This configuration allows in a simple manner to determine also for the angular range area II which of the angular ranges IIa or IIb the rotary element 1 is rotated by taking into account preceding and/or following angular range areas. Relevant hereby are only those determinations of the angular range area II with the sequence I-II-III or III-II-I. All other transitions are secondary.

When the determined angular range areas I, II, III have the sequence I-III-III, i.e., the angular range area II is detected only once, the rotary element 1 has passed the angular range IIb. On the other hand, when the angular range area II is registered several times during a transition from the angular range area I to the angular range area III, it follows that the rotary element 1 passes the angular range IIa. As a result, a passage of the rotary element 1 of the angular range IIa can always be recognized so long as the angular range area II is detected at least twice in immediate succession. Determination of the number of revolutions can be realized in a same manner as described in connection with the embodiment of FIG. 3.

The afore-described process ensures a supply of electric energy to the sensor arrangement 3, when the rotary element 1 rotates below a minimum rotation speed or, to be on the safe side, slightly above the minimum rotation speed. When the critical minimum rotation speed has been reached, the continuous rotation of the exciter magnet 7 is sufficient to induce high enough electric energy in the coil 9 even in the absence of a reversal of the energy storage magnet 8 so that the sensor arrangement 3 can be continuously supplied with electric energy from the power generation system 6. As a consequence of the continuous supply of power, the sensor arrangement 3 is able to constantly determine the raw signals S and the corresponding angular range areas I, II, III.

The angular range areas I, III have only a single angular range, so that the determination of their angular range is directly possible. Determination of the respective angular range IIa, IIb can be inferred by the sequence of the determined angular range areas I, II, III, because the rotary element 1 rotates in this case as a prerequisite at a rotation speed above the minimum level. As a consequence of the limited scanning rate of the sensor 4 and the small width of the angular range IIb, the angular range IIb will be registered per revolution significantly less frequently than the angular range IIa. The rotation speed cannot, however, be altered indiscriminately.

Inference can be made to a passage of the angular range IIa, when the number of angular range areas II, determined together, is greater than the number of immediately preceding or following angular range areas I, III. Otherwise, when the number of interrelated angular range areas II is smaller than the number of immediately preceding or following angular range areas I, III, a passage of the angular range IIb can be inferred. Of course, other evaluation processes are conceivable as well, e.g. on the basis of the absolute length of the angular range area II, determined together. The number of revolution can be established again by the sequence of determined angular ranges I, IIa, IIb, III.

In the afore-described exemplified embodiment, the raw signal S of the sensor 4 is already quantized or digitized as a result of the configuration of screen zones 1a, 1b, 1c. It is, however, also possible, that the raw signal 1 S of the sensor 4 steadily ascends during a revolution of the rotary element 1 in the angular ranges I, IIa, III and descends abruptly in the angular range IIb. Also, the sensor 4 need not be an optical sensor. The principle of the present invention is equally applicable for a capacitive or magnetosensitive sensor, for a strain gauge or for a coil system based on transformation theory. Furthermore, through comparison of more than two threshold values SW1, SW2, a differentiation between more than three angular range areas I, II, III is possible.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A revolution counter for determining a number of revolutions of a rotary element, comprising:

a sensor arrangement having a single sensor, and an evaluation circuit placed downstream of the sensor, said sensor scanning the rotary element and generating a raw signal commensurate with a rotary position of the rotary element for ascertaining one of at least three areas of angular ranges, wherein a first area and a second area of the at least three areas of angular ranges each include a single continuous angular range and a third area of the at least three areas of angular ranges includes at least two angular ranges which interrelate but are separated from one another; and a power generation system constructed to deliver energy pulses to the sensor arrangement, when the rotary element rotates below a minimum rotation speed, wherein the sensor arrangement generates the raw signal commensurate with a determination of the corresponding one of the areas of angular ranges, wherein the power generation system and the rotary element are so coupled to one another as to ascertain for at least part of the first, second and third areas of angular ranges as determined during output of the energy pulses, by which one of the angular ranges the rotary element is rotated, and to establish the number of revolutions based on the ascertained angular ranges.

2. The revolution counter of claim 1, wherein the power generation system and the rotary element are so coupled to one another as to output the energy pulses, when the rotary element rotates below the minimum rotation speed, while the rotary element is positioned in one of a plurality of known pulse angular ranges, and to ascertain on the basis of the known pulse angular ranges by which of the two angular ranges of the third area the rotary element is rotated.

3. The revolution counter of claim 1, wherein each of the angular ranges of the third area is ascertainable on the basis of previously or subsequently ascertained first and second areas of angular ranges.

4. The revolution counter of claim 1, wherein the power generation system supplies energy continuously to the sensor arrangement, when the rotary element rotates above a minimum rotation speed, whereby the sensor arrangement continuously registers the raw signals and the corresponding first, second and third areas of angular ranges as well as ascertains for the third area by which of the two angular ranges of the third area the rotary element is rotated, to thereby determine the number of revolutions.

5. The revolution counter of claim 1, wherein the sensor arrangement is constructed for clocked operation.

6. The revolution counter of claim 1, wherein the power generation system includes an exciter magnet, which is arranged at an angle with respect to the rotary element, and a storage energy magnet interacting with the exciter magnet for generating the energy pulse through reversal of polarity to thereby provide power to the sensor arrangement.

7. A method for determining a number of revolutions of a rotary element, comprising the steps of:

subdividing a rotary element into at least a first area of singular angular range area, a second area of singular angular range, and a third area of at least two relating but separate angular ranges;

scanning the rotary element, as it rotates, to generate an output signal for each rotary position;

associating the output signal to a one of the angular range areas whereby the association of the output signal to the third area is realized by generating an energy pulse only when the rotary element is positioned in one of the angular ranges of the third area; and determining the number of revolutions of the rotary element on the basis of the angular range areas being ascertained.

8. The method of claim 7, wherein the association of the output signal to the first and second areas is executed directly.

9. The method of claim 7, wherein a revolution of the rotary element generates ten energy pulses, wherein the first and second areas have each at least two pulse angular ranges, and wherein the one of the angular ranges of the third area has at least four pulse angular ranges.

10. The method of claim 9, wherein the one of the angular ranges of the third area has five pulse angular ranges.

11. The method of claim 9, wherein the other one of the angular ranges of the third area has one pulse angular range only.

* * * * *